United States Patent [19]

Sugimoto et al.

[11] 3,931,482

[45] Jan. 6, 1976

[54] FOUR-CHANNEL STEREOPHONIC REPRODUCING SYSTEM FOR REPRODUCING DISCRETE FOUR-CHANNEL STEREOPHONIC DISCS

[75] Inventors: Yukio Sugimoto, Katano; Makoto Okamasa, Kyoto; Toyoshi Fukumura, Neyagawa, all of Japan

[73] Assignee: Matsushita Electric Industrial Co., Ltd., Osaka, Japan

[22] Filed: Apr. 24, 1974

[21] Appl. No.: 463,669

[30] Foreign Application Priority Data

Apr. 25, 1973 Japan .............................. 48-48027

[52] U.S. Cl.. 179/100.4 ST; 179/1 GQ; 179/15 BT; 169/100.1 TD

[51] Int. Cl.[2] ........................ G11B 3/74; H04B 5/00

[58] Field of Search ... 179/1 GQ, 15 BT, 100.1 TD, 179/100.4 ST, 100.4 C, 100.4 M

[56] References Cited

UNITED STATES PATENTS

| | | | |
|---|---|---|---|
| 3,564,434 | 2/1971 | Camenzind et al. | 329/122 |
| 3,686,471 | 8/1972 | Takahashi | 179/100.1 TD |
| 3,803,367 | 4/1974 | Takahashi | 179/100.1 TD |
| 3,825,697 | 7/1974 | Cornell et al. | 179/15 BT |

OTHER PUBLICATIONS

Further Improvements in the Discrete Four Channel Disc System CD-4 by Owaki et al., Vol. 20, No. 5 J.A.E.S. located 179/100.1 TD.

*Primary Examiner*—Terrell W. Fears
*Assistant Examiner*—Stewart Levy
*Attorney, Agent, or Firm*—Stevens, Davis, Miller & Mosher

[57] ABSTRACT

In a four-channel stereophonic reproducing system of the type in which a first, second, third and fourth audio signals are reproduced from two stereophonic composite signals which are respectively comprised of a left side signal consisting of a main channel signal composed of the sum of the first and second audio signals and a sub-channel signal obtained by frequency modulating or phase modulating the difference between the first and second audio signals, and a right side signal consisting of a main channel signal composed of the sum of the third and fourth audio signals and a sub-channel signal obtained by frequency modulating or phase modulating the difference between the third and fourth audio signals, a detector circuit for detecting each sub-channel signal is followed by a filter circuit for eliminating undesired higher frequencies whereby to eliminate higher audio frequencies including increased noise components to improve the S/N ratio, and at the same time a phase correction circuit is provided in the reproducing section for each main channel signal to correct for any phase distortion due to the filter circuit whereby to ensure a greatly improved separation.

6 Claims, 4 Drawing Figures

FOUR-CHANNEL STEREOPHONIC REPRODUCING SYSTEM FOR REPRODUCING DISCRETE FOUR-CHANNEL STEREOPHONIC DISCS

The present invention relates to a reproducing system for reproducing discrete four-channel stereophonic discs.

Discrete four-channel stereophonic discs are known in the art in which each main channel signal comprised of a sum signal is combined with a sub-channel signal comprised of a frequency-modulated or phasemodulated difference signal, and the resultant composite signals are recorded on a 45° – 45° stereophonic disc. While, in the reproduction of the signals recorded on this type of disc, the S/N ratio may be generally improved by eliminating the frequency characteristics of the sub-channel signals at the higher frequencies, this simultaneously results in a considerable phase distortion at the higher frequencies of the sub-channel signal and hence a seriously deteriorated separation.

It is therefore an object of the present invention to provide a four-channel stereophonic reproducing system for reproducing discs of the above type having a pair of low-pass filters for deriving the main channel signals from the stereophonic composite signals, and a pair of high-pass filters for deriving the sub-channel signals from the stereophonic composite signals, wherein each of the detector circuits for detecting the sub-channel signals is followed by a filter circuit for eliminating higher frequencies to improve the S/N ratio, and a phase correction circuit is provided in each of the main signal reproducing sections to correct for any phase distortion caused by the filter circuit.

It is another object of the present invention to provide a four-channel stereophonic reproducing system of the above type wherein the phase correction circuit comprises a transistor and a series circuit of a resistor and a capacitor connected across the collector and emitter of the transistor.

It is still another object of the present invention to provide a four-channel stereophonic reproducing system of the above type wherein the phase correction circuit is constructed by utilizing the transistor constituting a part of the low-pass filter.

It is still another object of the present invention to provide a four-channel stereophonic reproducing system of the above type wherein the phase correction circuit is temperature compensated by a thermistor connected to the emitter of the transistor constituting the phase correction circuit.

It is still anoter object of the present invention to provide a four-channel stereophonic reproducing system of the above type wherein the resistor and the capacitor in the phase correction circuit for one signal reproducing section respectively have a resistance value and a capacitance value which are different from those of the resistor and the capacitor in the phase correction circuit for the other signal reproducing section whereby to effect the phase correction for the left and right signals simultaneously with the phase correction for the main and sub-channel signals.

The above and other objects, features and advantages of the present invention will become readily apparent from considering the following detailed description taken in conjunction with the accompanying drawings, in which.

The present invention will now be described in greater detail with reference to the illustrated embodiments.

Figure 1:
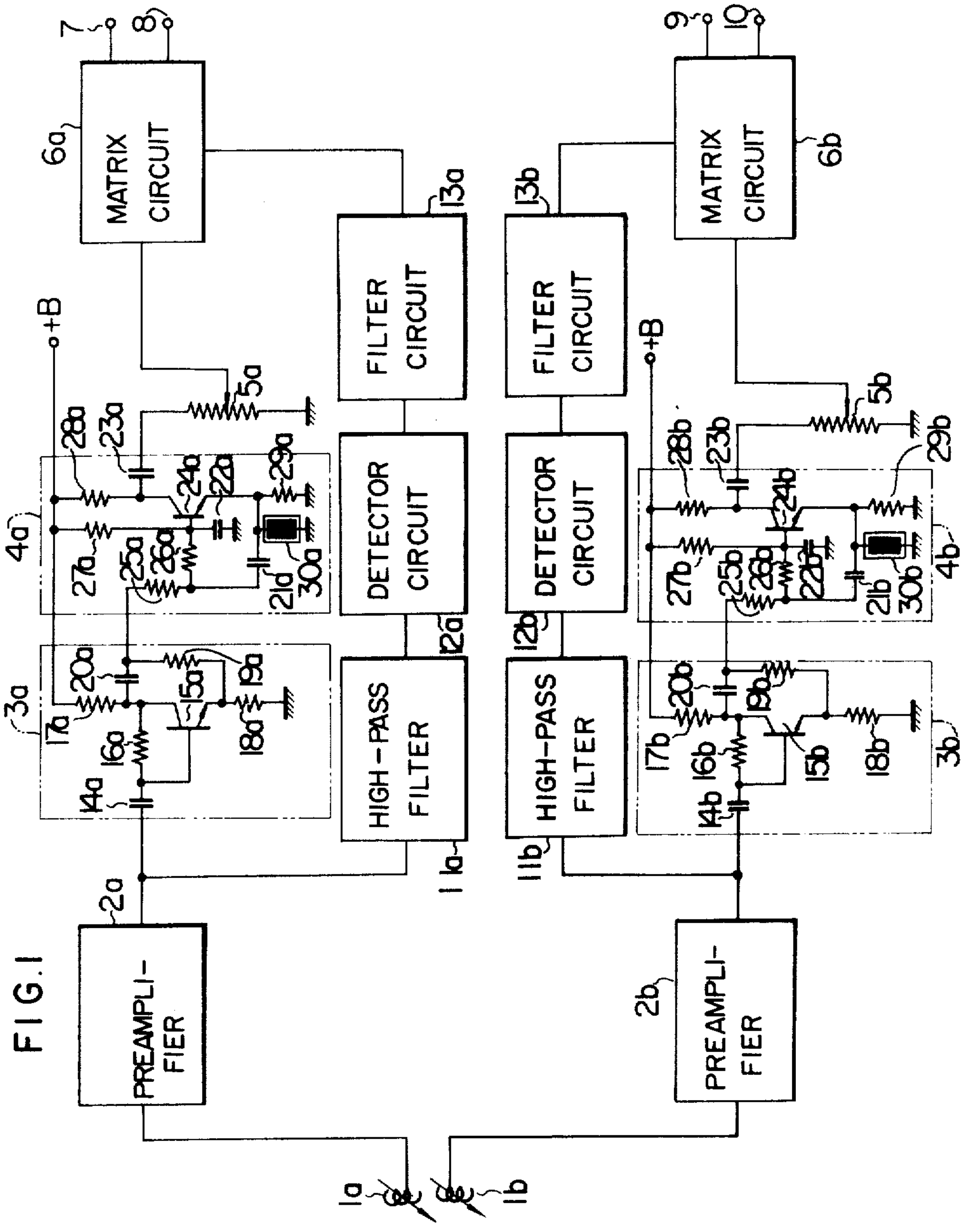
FIG. 1 is a wiring diagram showing an embodiment of a four-channel stereophonic reproducing system according to the present invention.

Referring first to FIG. 1 illustrating a first embodiment of the invention, numerals 1*a* and 1*b* designate left and right cartridges, 2*a* and 2*b* preamplifiers, 3*a* and 3*b* phase correction circuit, 4*a* and 4*b* low-pass filters for passing only the main channel signal components from the stereophonic composite signals, 5*a* and 5*b* separation adjusting volumes, 6*a* and 6*b* matrix circuits, 7, 8 and 9, 10 the output terminals of the matrix circuits 6*a* and 6*b*, 11*a* and 11*b* high-pass filters for passing only the sub-channel signal components from the stereophonic composite signals, 12*a* and 12*b* detector circuits for detecting the sub-channel signals, 13*a* and 13*b* filter circuits for eliminating higher frequencies to improve the S/N ratio.

The phase correction circuits 3*a* and 3*b* respectively comprise coupling capacitors 14*a* and 14*b*, transistors 15*a* and 15*b*, bias resistors 16*a*, 17*a*, 18*a* and 16*b*, 17*b*, 18*b* respectively provided for the transistors 15*a* and 15*b*, and a series circuit of a resistor 19*a* and a capacitor 20*a* and a series circuit of a resistor 19*b* and a capacitor 20*b* respectively connected across the collector and emitter of the transistors 15*a* and 15*b*. The low-pass filters 4*a* and 4*b* respectively comprise capacitors 21*a*, 22*a*, 23*a* and 21*b* 22*b*, 23*b*, transistors 24*a* and 24*b*, resistors 25*a*, 26*a*, 27*a*, 28*a*, 29*a* and 25*b*, 26*b*, 27*b* 28*b* 29*b*, and thermistors 30*a* and 30*b* respectively connected to the emitter of the transistors 24*a* and 24*b*. The resistance value of the resistor 19*a* and the capacitance value of the capacitor 20*a* in the phase correction circuit 3*a* are selected to differ from those of the corresponding resistor 19*b* and the capacitor 20*b* in the phase correction circuit 3*b*.

Figure 2:
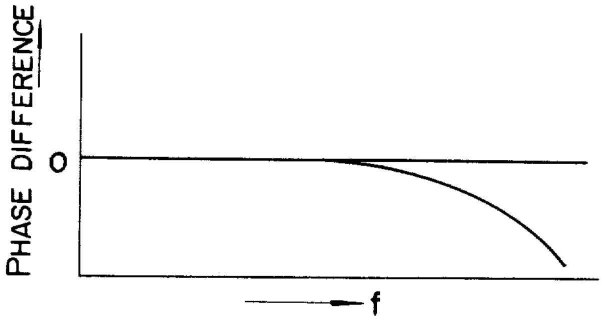
FIG. 2 is a frequency versus phase difference characteristic diagram of the filter circuit used in the embodiment of FIG. 1.
Figure 3:
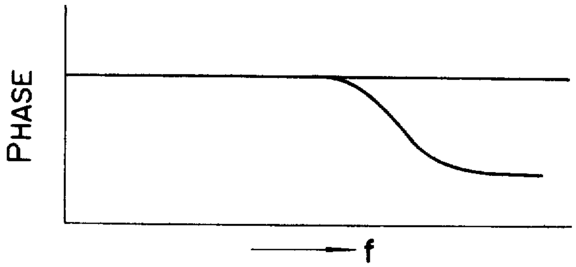
FIG. 3 is a frequency versus phase characteristic diagram of the phase correction circuit used in the embodiment of FIG. 1.

The embodiment of FIG. 1 operates as follows. The stereophonic composite signals picked up by the cartridges 1*a* and 1*b* are respectively applied through the preamplifiers 2*a* and 2*b* to the phase correction circuits 3*a* and 3*b* and the high-pass filters 11*a* and 11*b*. The sub-channel signals passed through the high-pass filters 11*a* and 11*b* are respectively applied to the detector circuits 12*a* and 12*b* where the frequency-modulated or phase-modulated sub-channel signals are detected to produce outputs corresponding to the differences between the front and rear signals at the output terminals thereof. In this case, the sub-channel signals tend to include considerable noise components due to flaws, dust, dirt and the like on the disc and therefore considerable noise is present at the output terminals of the high-pass filters 11*a* and 11*b*. Consequently, in the present embodiment, the outputs of the detector circuits 12*a* and 12*b* are respectively passed through the filter circuits 13*a* and 13*b* to eliminate the higher frequencies including large noise components. However, as shown in FIG. 2, the elimination of the higher frequencies results in a considerable phase difference in the higher frequency range and this has a detrimental effect on the separation. To overcome this difficulty, the preamplifiers 2a and 2b are respectively followed by the phase correction circuits 3a and 3b each having the frequency characteristic shown in FIG. 3. Therefore, similar to the sub-channel signals, the phases of the main channel signals applied to the matrix circuits 6a and 6b through the low-pass filters 4a and 4b are shifted to place both channels substantially in phase with each other. This ensures a very high degree of separation between the front and rear signals produced at the output terminals 7, 8 and 9, 10 of the matrix circuits 6a and 6b, respectively.

Further, by virtue of the fact that in this embodiment the resistance value of the resistor 19a and the capacitance value of the capacitor 20a which are connected across the collector and emitter of the transistor 15a in one phase correction circuit 3a are selected to differ from those of the resistor 19b and the capacitor 20b which are connected across the collector and emitter of the transistor 15b in the other phase correction circuit 3b, the phase correction for the left and right signals can be accomplished simultaneously with the phase correction for the main channel and sub-channel signals.

Furthermore, the stereophonic reproduction by the system according to this embodiment is further improved by the fact that the thermistors 30a and 30b are respectively connected to the emitters of the transistors 24a and 24b in the low-pass filters 4a and 4b and the low-pass filters 4a and 4b are thus compensated for the effects of temperature through the action of the thermistors 30a and 30b to stabilize the operation of the low-pass filters 4a and 4b.

Figure 4:
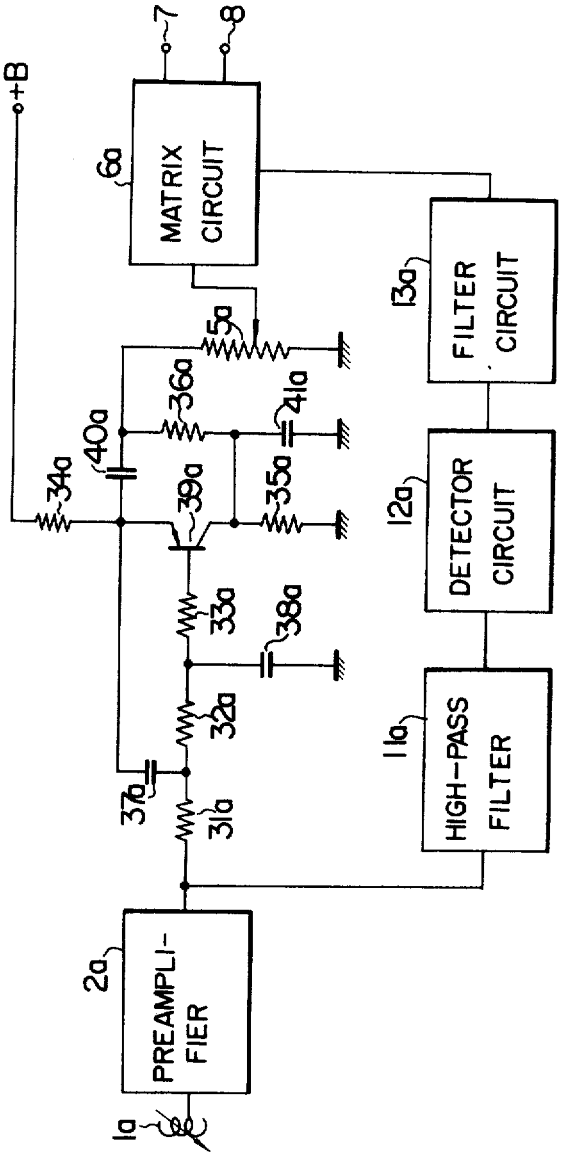
FIG. 4 is a wiring diagram showing another embodiment of the four-channel stereophonic reproducing system according to the invention.

FIG. 4 illustrates a wiring diagram of another embodiment of the four-channel stereophonic reproducing system according to the invention. In FIG. 4 showing only the circuitry for one of the left and right channels, the component parts which are identical in function with those of the embodiment shown in FIG. 1 are designated by the same reference numerals. In the embodiment of FIG. 4, the low-pass filter is comprised of resistors 31a, 32a, 34a and 35a, capacitors 37a and 38a and a transistor 39a, and the phase correction circuit is comprised of the transistor 39a, resistors 34a, 35a and 36a and capacitors 40a and 41a. Namely, in this embodiment, the phase correction circuit is constructed by utilizing the transistor 39a of the low-pass filter and in this way the function of the low-pass filter and that of the phase correction circuit are performed by using the single transistor 39a. Further, the characteristic of the low-pass filter is determined by the resistors 31a and 32a and the capacitors 37a and 38a, while the resistor 36a and the capacitor 40a determine the characteristics of the phase correction circuit. Thus, by providing the same circuitry for the other channel, the circuit construction of the entire system can be simplified and the system can function identically with the embodiment shown in FIG. 1.

Further, in both embodiments, each phase correction circuit should preferably be constructed to correct for phase distortion only without changing the signal level.

It will thus be seen from the foregoing description that the system according to this invention has a great advantage since it is capable of not only improving the signal-to-noise ratio, but also ensuring a greatly improved separation by its novel arrangement in which in addition to the filter circuits for eliminating higher audio frequencies which are provided in the sub-channel signal reproducing sections, the phase correction circuits are provided in the main channel signal reproducing sections to correct for any phase distortion caused by the filter circuits.

What we claim is:

1. A four-channel stereophonic reproducing system for reproducing first, second, third and fourth audio signals from a first stereophonic composite signal consisting of a main channel signal comprised of an addition of said first and second audio signals and a sub-channel signal obtained by frequency modulating or phase modulating a difference between said first and second audio signals, and a second stereophonic composite signal consisting of a main channel signal comprised of an addition of said third and fourth audio signals and a sub-channel signal obtained by frequency modulating or phase modulating a difference between said third and fourth audio signals, said system comprising: first reproducing means for reproducing said first and second signals from said first stereophonic composite signal; and second reproducing means for reproducing said third and fourth audio signals from said second stereophonic composite signal, each of said first and second reproducing means including main channel signal reproducing means having a low-pass filter for passing said main channel signal in said first or second stereophonic composite signal, and sub-channel signal reproducing means having a high-pass filter for passing said subchannel signal in said first or second stereophonic composite signal, said sub-channel signal reproducing means including a detector circuit for detecting the output of said high-pass filter and a filter circuit for eliminating higher frequencies of the output of said detector circuit, and said main channel signal reproducing means further including a phase correction circuit for producing a phase lag equal to that of the signal in said sub-channel signal reproducing means.

2. A system according to claim 1, wherein said phase correction circuit comprises a transistor, and a series circuit including a resistor and a capacitor connected across the collector and emitter of said transistor, and the junction point of said resistor and said capacitor provides an output terminal.

3. A system according to claim 1, wherein said low-pass filter in said main channel signal reproducing means comprises at least one transistor, and resistors and capacitors connected to the base of said transistor, wherein a series circuit of a resistor and a capacitor is connected across the collector and emitter of said transistor, and wherein said correction circuit is comprised of said transistor and said resistor and capacitor constituting said series circuit.

4. A system according to claim 1, wherein said low-pass filter includes at least one transistor, and a temperature compensating thermistor is connected to the emitter of said transistor.

5. A system according to claim 1, wherein at least one of said first reproducing means for reproducing said first stereophonic composite signal and said second reproducing means for reproducing said second stereophonic composite signal is provided with phase correction means to correct for a phase difference between said first and second stereophonic composite signals.

6. A system according to claim 1, wherein the values of said resistor and said capacitor in one of said phase correction circuits provided in said first and second reproducing means for reproducing said first and second stereophonic composite signals, are selected to differ from those of said resistor and said capacitor in the other of said phase correction circuits, whereby a phase difference between said first and second reproducing means is corrected for by said phase correction circuits.

* * * * *